United States Patent [19]

Watanabe et al.

[11] Patent Number: 5,761,001
[45] Date of Patent: Jun. 2, 1998

[54] MAGNETIC HEAD ASSEMBLY AND A MAGNETIC DISK APPARATUS USING THE SAME

[75] Inventors: Makoto Watanabe; Takashi Nawata, both of Tokyo, Japan

[73] Assignee: NEC Corporation, Tokyo, Japan

[21] Appl. No.: 413,833

[22] Filed: Mar. 30, 1995

[30] Foreign Application Priority Data

Mar. 31, 1994 [JP] Japan ................. 6-062214

[51] Int. Cl.$^6$ ................................. G11B 5/60
[52] U.S. Cl. ........................... 360/103; 360/104
[58] Field of Search ..................... 360/103–106, 360/125, 126; 29/603

[56] References Cited

U.S. PATENT DOCUMENTS

| | | | |
|---|---|---|---|
| 4,639,803 | 1/1987 | Takeda et al. | 360/103 |
| 4,761,699 | 8/1988 | Ainslie et al. | 360/103 |
| 5,136,445 | 8/1992 | Zak | 360/103 |
| 5,234,556 | 8/1993 | Oishi et al. | 204/157.51 |
| 5,274,502 | 12/1993 | Demerritt et al. | 359/642 |
| 5,315,609 | 5/1994 | Tanaka et al. | 372/43 |
| 5,329,201 | 7/1994 | Shirasaki | 310/323 |
| 5,353,181 | 10/1994 | Frater et al. | 360/104 |
| 5,392,179 | 2/1995 | Sendoda | 360/104 |

FOREIGN PATENT DOCUMENTS

4-283478 10/1992 Japan.

*Primary Examiner*—Jefferson Evans
*Attorney, Agent, or Firm*—Whitham, Curtis & Whitham

[57] ABSTRACT

A slider is attached to a spring with an epoxy adhesive. The thermal expansion coefficient of the spring is set greater than that of the slider by 10% to 60%. In this range, the deformation of the slider is reduced more effectively than when the thermal expansion coefficients of the slider and the spring are set substantially identical. The slider has a crown. The crown is formed by attaching a face of the slider to a concave surface, forming flat another face of the slider opposing the attached face, and disengaging the slider from the concave surface.

2 Claims, 9 Drawing Sheets

| TEMPERATURE | 1 | 2 | 3 | 4 | 5 | 6 |
|---|---|---|---|---|---|---|
| 0~10(5) | 5.58046 | 5.48765 | 5.65228 | 5.47015 | 5.48277 | 5.36164 |
| 10~20(15) | 5.65449 | 5.52813 | 5.54413 | 5.52326 | 5.5328 | 5.55054 |
| 20~30(25) | 5.53177 | 5.54857 | 5.53373 | 5.55346 | 5.47363 | 5.51856 |
| 30~40(35) | 5.5117 | 5.56913 | 5.61023 | 5.4227 | 5.22245 | 5.51763 |
| 40~50(45) | 5.60301 | 5.5618 | 5.54809 | 5.54341 | 5.05186 | 5.5703 |
| 50~60(55) | 5.56016 | 5.50684 | 5.82846 | 5.85929 | 4.94746 | 5.70866 |
| 60~70(65) | 5.86008 | 5.87764 | 5.85132 | 5.88132 | 5.02828 | 6.08034 |
| 70~80(75) | 5.90776 | 5.88361 | 5.98678 | 5.99029 | 5.61701 | 6.00217 |
| 80~90(85) | 6.1543 | 6.02894 | 6.15596 | 6.06756 | 5.94883 | 6.20681 |
| 90~100(95) | 6.25167 | 6.12821 | 6.22008 | 6.35116 | 6.2589 | 6.43073 |
| AVERAGE OF THERMAL EXPANSION COEFFICIENTS | 5.76154 | 5.712042 | 5.793106 | 5.76626 | 5.456399 | 5.794738 |

SAMPLE NUMBER

FIG.11

MAGNETIC HEAD ASSEMBLY AND A MAGNETIC DISK APPARATUS USING THE SAME

BACKGROUND OF THE INVENTION

The present invention relates to a magnetic head assembly for use in magnetic disk apparatuses.

A magnetic head assembly for use in a hard disk apparatus or a floppy disk apparatus includes a slider and a gimbal spring.

The slider is an extremely hard member highly resistant to wear. Typical slider materials include sintered metallic oxide such as ceramics and ferrites. An electromagnetic transducer element is attached to the slider for converting electric signals into magnetization and vice versa. The slider itself may also constitute part of the electromagnetic converter. The slider is fixed to the gimbal spring with an adhesive.

The gimbal spring is an elastic metallic member. The gimbal spring, typically made of stainless steel, holds the slider over a magnetic recording medium.

The gimbal spring positions the slider on/above the slider against the magnetic recording medium. Therefore, when the magnetic recording medium is stationary, the slider is in contact with the recording medium. When the magnetic recording medium begins rotating, the slider glides over the medium and it takes off the medium to fly. When the magnetic recording medium is rotating, the slider flies over the recording medium keeping a small gap between the slider and the disk. When the recording medium stops, the slider again comes into contact with the magnetic recording medium.

Figure 1:
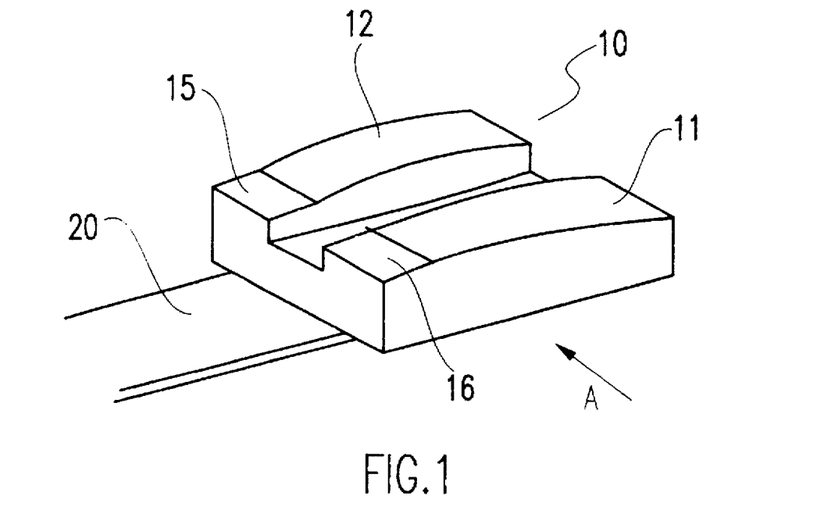
FIG. 1 illustrates the structure of a slider 10 for use in a magnetic head.

The usual shape of the slider is illustrated in FIG. 1. A slider 10 is secured to a gimbal spring 20. The slider 10 has flying surfaces 11 and 12.

Figure 2:
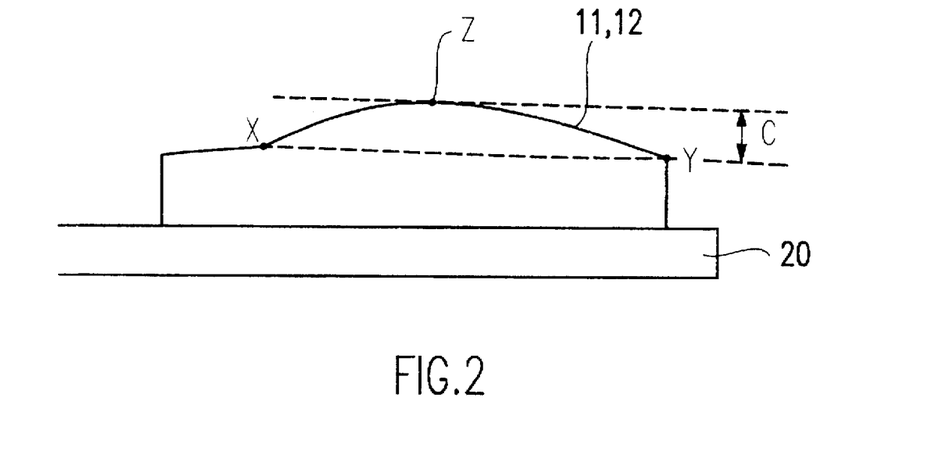
FIG. 2 explains the crown height C of the slider according to FIG. 1.

Referring now to FIG. 2, the flying surfaces 11 and 12 are formed to be slightly convex. These convex faces are called "crown". The crown height C here refers to the distance C between the straight line connecting the terminal points X and Y of the flying surfaces 11 or 12 and the point Z on the flying surfaces 11 or 12 where the distance from the straight line is the greatest. When the flying surface is 2 mm long and 0.3 mm wide, the crown height C is about 0.010–0.050 µm.

The crown prevents the slider from sticking to the media. The crown also serves to shorten the gliding distance at a time of disk start and stop and contributes to increasing the durability of the medium.

As shown in FIG. 1, at the fore ends of the flying surfaces 11 and 12 in the direction of the disk's movement are formed chamfered portions 15 and 16 at an angle of about 30 minutes. The chamfered portions 15 and 16 produce flying pressure particularly when the disk speed is low.

In order to read/write signals properly, the flying attitude of the slider 10 should be kept stable so that distance between the transducer and the media is kept constant. The flying attitude of the slider 10 are affected by the shape of the flying surfaces 11 and 12. Therefore, in order to keep the flying attitude of the flying slider 10 constant, the shape of the flying surfaces 11 and 12, i.e. the shape of the crown, should be kept constant under every possible operating condition.

However, the crown is significantly deformed by a thermal change. This crown deformation can be assessed by a change in the crown height C. The varying rate of the crown height C by a thermal change may exceed 50%.

An example of a technique to restrain the deformation of the crown by a thermal change (hereinafter referred to as "the prior art technique") is described in Japanese Utility Model Laid-open No. 133362 of 1989.

The prior art technique presumes that the deformation of the magnetic head results from the difference in the thermal expansion coefficient between the slider material and that of the gimbal spring. The slider material is attached (e.g. glued) to the gimbal spring at an elevated temperature. After the glue is cured, the slider material and the gimbal spring are cooled to room temperature. If the thermal expansion difference between the slider material and the gimbal spring is significant, the slider material deforms because of the temperature difference between before and after the gluing.

The prior art technique reduces the magnetic head deformation by equalizing the thermal expansion coefficient of the slider material and that of the gimbal spring. Specifically, according to the prior art technique, alumina carbide titanate ($Al_2O_3TiC$) is used as the material for the magnetic head, and 43 wt % Ni, as that for the gimbal spring. In this case, the thermal expansion coefficients of the magnetic head and the gimbal spring are substantially identical at $7.9\times10^{-6}$.

However, experiments have revealed that the prior art technique cannot reduce the magnetic head deformation sufficiently. This experiment will be hereinafter referred to as experiment #0. In experiment #0, the slider was made of alumina carbide titanate and the gimbal spring was made of 42 alloy containing 42 wt % of Ni.

Figure 3:
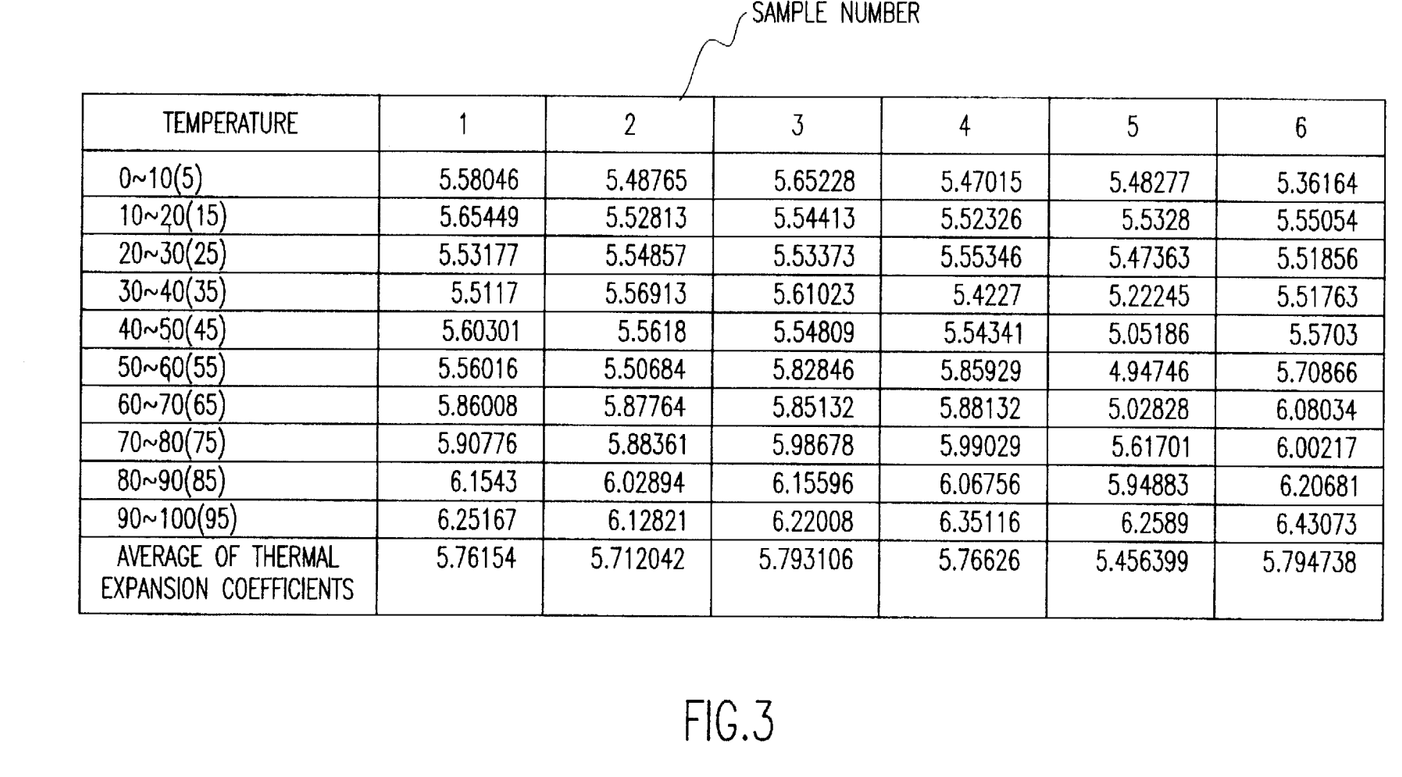
FIG. 3 shows the results of measurement of the thermal expansion coefficient of the slider used in experiment #0.

Before experiment #0, the thermal expansion coefficient of the slider was measured, and the result is shown in FIG. 3. In this test, the thermal expansion coefficients of six samples were measured at 10° C. intervals. The average of the measurements demonstrated that the thermal expansion coefficient of the slider was about $5.7\times10^{-6}$ in the temperature range of 0° C. to 80° C.

On the other hand, the thermal expansion coefficient of the gimbal spring was $6.0\times10^{-6}$.

Thermal expansion coefficient difference D between the slider and the gimbal spring was about 5%. The thermal expansion coefficient difference D is defined as $((E1/E2)-1)\times100$, where E1 and E2 are the thermal expansion coefficient of the gimbal spring and the slider, respectively. The thermal expansion coefficient difference of 5% means that the thermal expansion coefficient of the slider and that of the gimbal spring are substantially identical.

Figure 4:
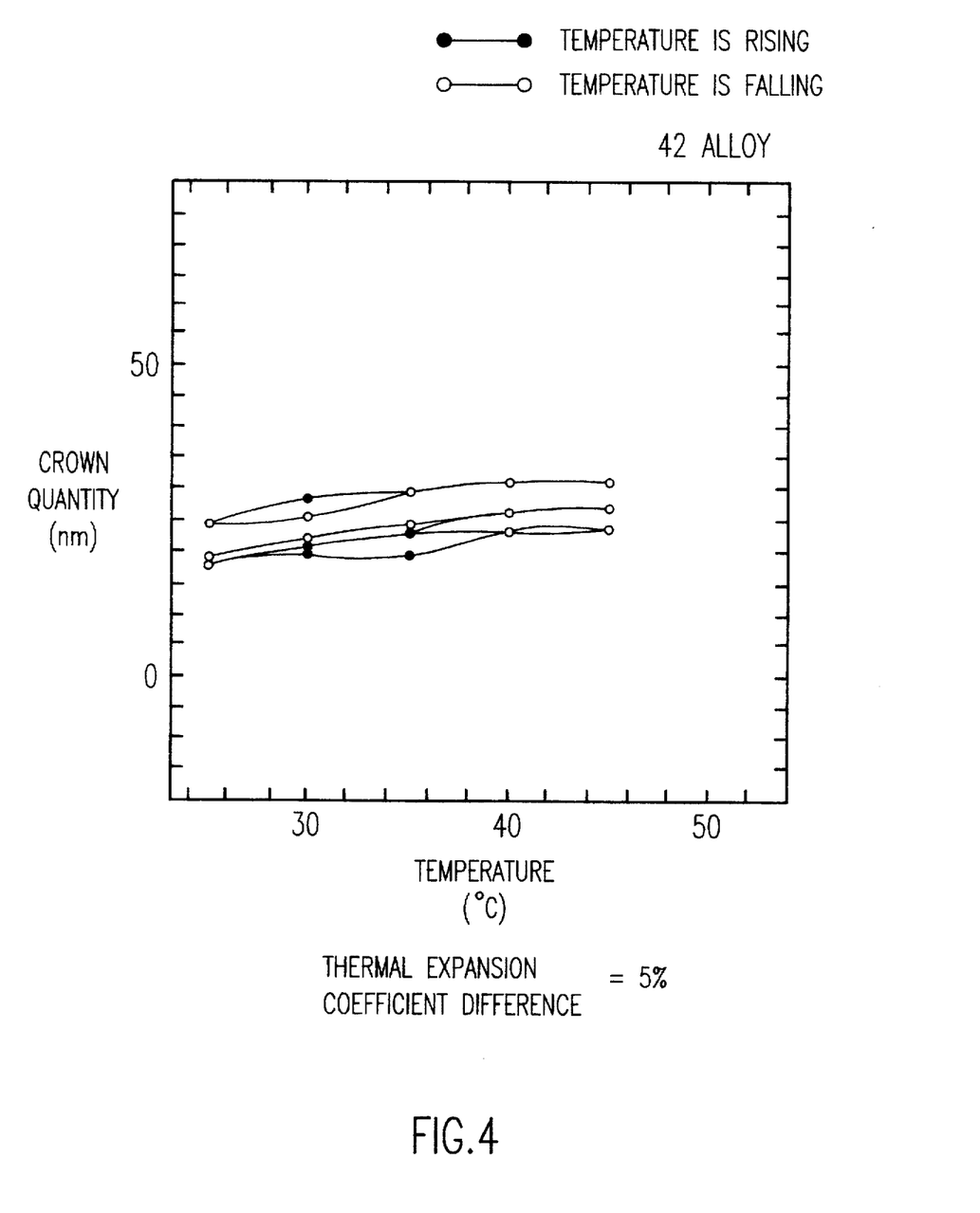
FIG. 4 is a diagram illustrating the results of the experiment #0.

The results of experiment #0 are illustrated in the chart of FIG. 4.

In the graph of FIG. 4, the horizontal axis represents the temperature, and the vertical axis represents the crown height C. The solid circles indicate measurements when the temperature is rising. The open circles indicate measurements when the temperature is falling. In this experiment, after the crown height C was measured while increasing the temperature from about 20° C. to 40° C., it was measured again while decreasing the temperature to 20° C. This two-way process is defined to be one trial. The measurements in a trial are linked by curves in the graph. In the experiment, three sliders each having different crown heights by about 10 nm were subjected to the trial, with results corresponding to the three curved lines being illustrated in FIG. 11.

According to experiment #0, the average variation of the crown height C per 20° C. temperature change was 8 nm, which reveals that the prior art technique cannot sufficiently reduce the crown deformation.

SUMMARY OF THE INVENTION

In view of the above problem, an object of the present invention is to effectively reduce deformation of slider material.

In order to solve the problem, experiments were conducted. Those experiments disclosed that crown deformation could be more effectively reduced by setting the thermal expansion coefficient of the gimbal spring greater than that of the slider. This result is completely unexpected from the earlier common knowledge of those skilled in the art.

On the basis of this experimental result, according to the present invention, the thermal expansion coefficients of the slider and the gimbal spring are chosen so as to satisfy a specific relationship. Specifically, their thermal expansion coefficients are set so that the deformation of the gimbal spring cancels out that of the slider. More specifically, the thermal coefficient of the gimbal spring is set greater by a prescribed ratio than that of the slider.

In a magnetic head assembly according to the present invention, the thermal expansion coefficient of the gimbal spring is preferably set greater than that of the slider by 10% to 60%. When the thermal expansion coefficient of the slider is about $5.7 \times 10^{-6}$, that of the gimbal spring is preferably set in the range of $6.3 \times 10^{-6}$ to $9.1 \times 10^{-6}$.

In order to ensure the reduction of the crown deformation, the thermal expansion coefficient of the gimbal spring may be set greater than that of the slider by 30% to 50%. When the thermal expansion coefficient of the slider is about $5.7 \times 10^{-6}$, that of the gimbal spring is preferably set in the range of $7.4 \times 10^{-6}$ to $8.6 \times 10^{-6}$.

To minimize the crown deformation, the thermal expansion coefficient of the gimbal spring may be set greater than that of the slider by 46%. When the thermal expansion coefficient of the slider is about $5.7 \times 10^{-6}$, that of the gimbal spring is preferably set at $8.3 \times 10^{-6}$.

According to one embodiment of the present invention, the slider contains alumina carbide titanate. The gimbal spring contains cobalt in a weight ratio of 25% to 30%, chromium in a weight ratio of 8% to 12%, and nickel in a weight ratio of 15% to 30%.

The aforementioned configurations may be applied to a slider having a crown.

The aforementioned configurations also may be applied to a slider whose crown is formed by a first step of attaching the lower face of a material member to a concave surface, a second step of forming flat the upper surface of the material member, and a third step of disengaging the material member from the concave surface.

A magnetic head assembly according to the aforementioned configuration may be used in a hard disk drive or a floppy disk drive.

BRIEF DESCRIPTION OF THE DRAWINGS

Other objects, features and advantages of the present invention will become more apparent when the following description is read in conjunction with the accompanying drawings, wherein.

In these drawings, the same reference numerals depict the same parts, respectively.

DETAILED DESCRIPTION OF THE PREFERRED EMBODIMENTS

Next will be described a preferred embodiment of the present invention with reference to the drawings.

Figure 5:
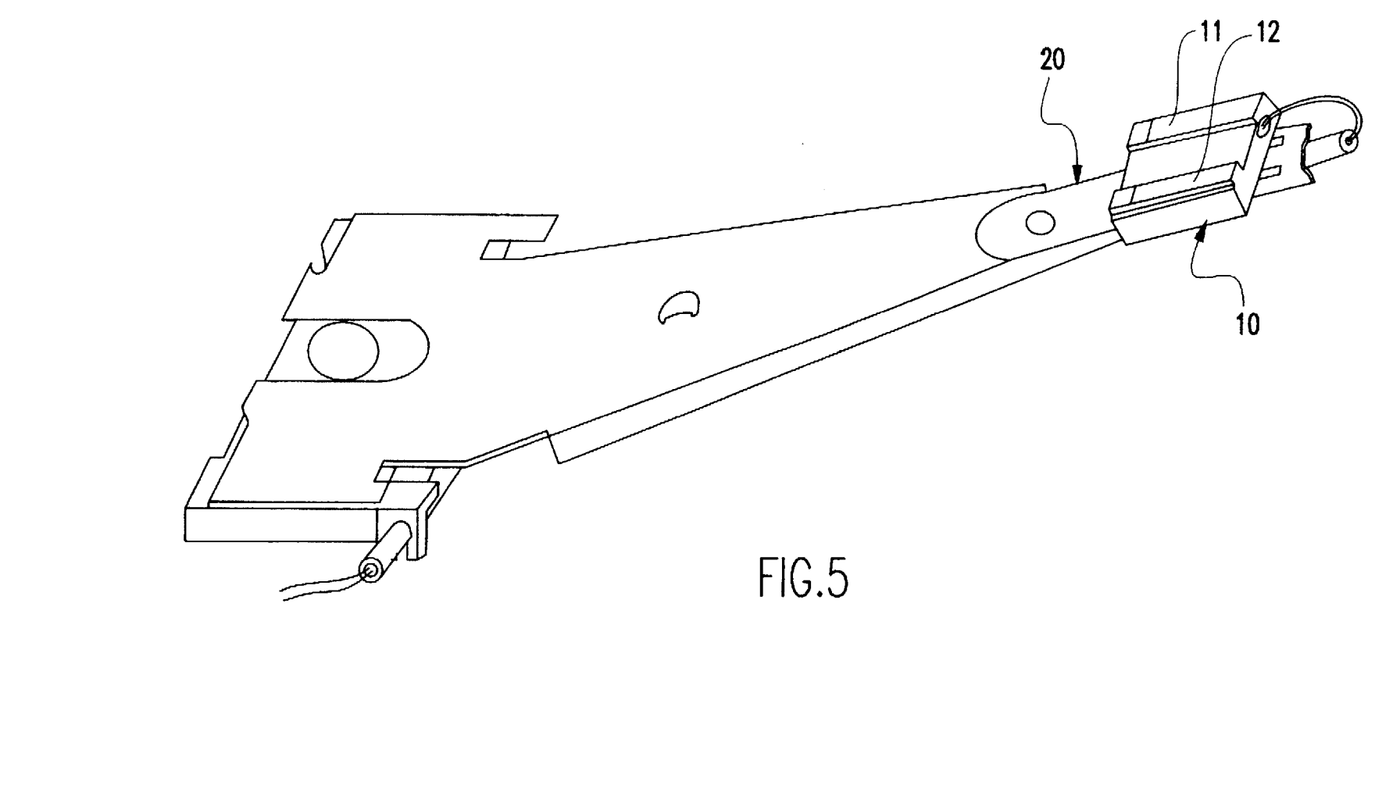
FIG. 5 shows a perspective view of a magnetic head assembly according to a first embodiment of the present invention.

Referring to FIG. 5, a magnetic head assembly according to the first embodiment of the present invention comprises a slider 10 and a gimbal spring 20.

The slider 10 has the same configuration as that of the prior art structure illustrated in FIG. 1. The slider 10 is approximately 2 mm in length, 1.5 mm in width and 0.5 mm in height. Its crown height C is 50 nm. The slider 10 is preferably made of alumina carbide titanate, which is a relatively hard ceramic.

The nominal thermal expansion coefficient of alumina carbide titanate in the temperature range of 25° C. to 900° C. is $7.9 \times 10^{-6}$. However, as measured during experiment #0, the thermal expansion coefficient of the slider 10 in this embodiment of the invention is about $5.7 \times 10^{-6}$ in the temperature range of 20° C. to 80° C.

The gimbal spring 20 is approximately 1.0 mm in width and 0.5 mm in height, and is made of a CoCrNi-based elastic material. More specifically, the material of the gimbal spring 20 is a metal mainly formed of 20–30 wt % of cobalt, 8–12 wt % of chromium and 15–30 wt % of nickel. The remaining constituent of the gimbal spring 20 is mainly iron. Spron #200 manufactured by Seiko Electronic Parts Co., Ltd. is a elastic alloy satisfying the above-specified composition. In the comparative experiment described below, Spron #200 is used as the material of the gimbal spring 20.

The thermal expansion coefficient of the gimbal spring 20 in the temperature range of 20° C. to 80° C. is about $8.3 \times 10^{-6}$. Accordingly, the thermal expansion coefficient difference between the slider 10 and the gimbal spring 20 is about 46%. For supplementary reference, the thermal expansion coefficient in the temperature range of 0° C. to 50° C. is $8.0 \times 10^{-6}$.

The slider 10 attached (e.g., glued) to the gimbal spring 20 with an adhesive. In the following experiment, an epoxy thermosetting product, more specifically EA9430 manufactured by Toray Industries, Inc., is used as the adhesive.

The crown of flying surfaces 11 and 12 is formed by the following method.

Figure 6A:
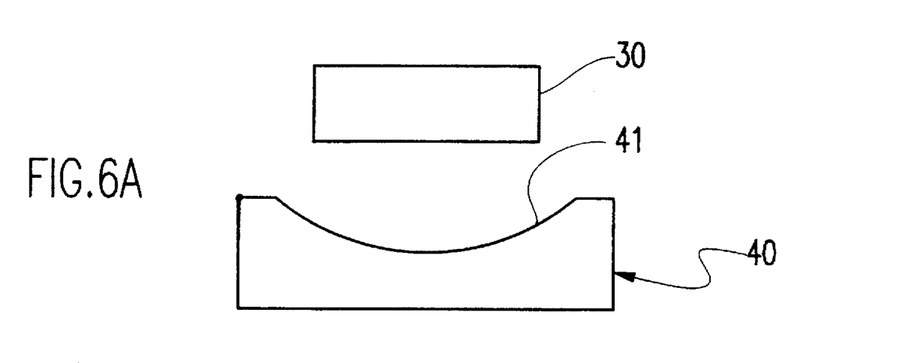
FIGS. 6(a), 6(b), 7(a) and 7(b) are diagrams illustrating a method of fabricating the slider 10.

Referring to FIG. 6(a), a fixture 40 whose upper face 41 is formed into a concave shape and a member 30 which is formed of alumina carbide titanate are prepared. The member 30 is processed into the slider 10.

Figure 6B:
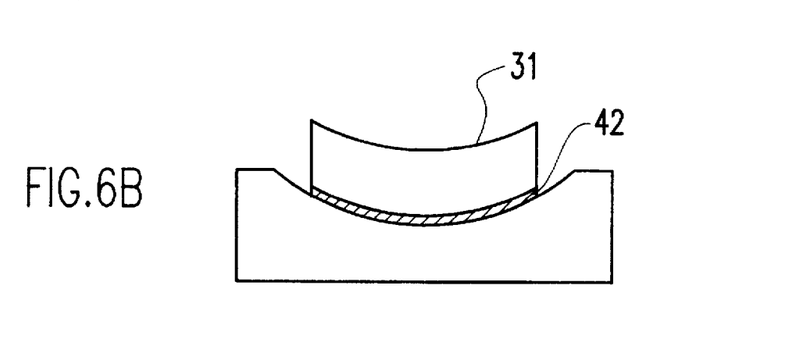

Referring to FIG. 6(b), in the first step, the lower face of the member 30 is glued to the upper face 41 of the fixture 40 with an adhesive 42. By being attached to the curved upper face 41, the member 30 becomes curved and stress exists in the curved member 30.

Figure 7A:
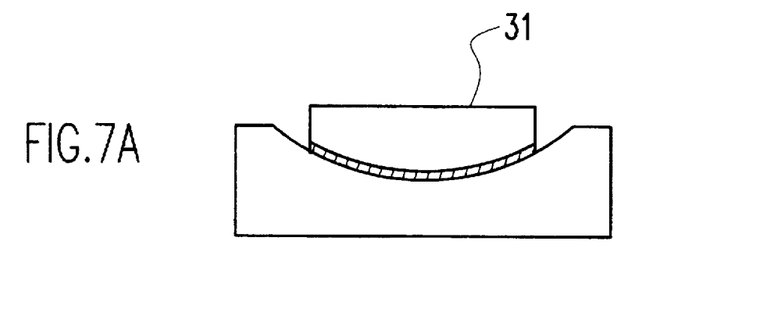

Referring to FIG. 7(a), in the second step, the upper face 31 of the member 30 is cut into a flat shape.

Figure 7B:
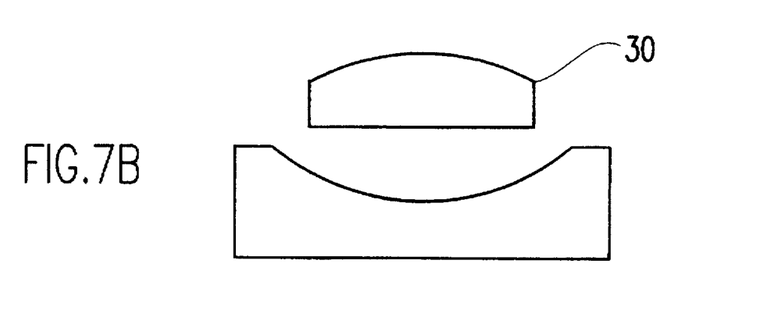

Referring to FIG. 7(b), in the third step, the member 30 is removed from the fixture 40, and is relieved from the internal stress. The curvature of the lower face of the member 30 is thereby removed. On the other hand, this step produces the curvature of the upper face of the member 30, and this curvature constitutes the crown.

Next will be described the results of a comparative experiment to verify the effect of this embodiment with reference to FIGS. 4 and 8–10.

In this experiment, the temperature-dependent variations of the crown height C of the slider 10 were measured. Three gimbal springs 20 each different in their thermal expansion coefficients were subjected to the experiment.

The experimental method was the same as that of experiment #0. That is, in this experiment, after the crown value C was measured while increasing the temperature from 20° C. to 40° C., it was measured again while decreasing the temperature to 20° C. This two-way process is defined to be one trial. During the experiment, each of a plurality of sliders 10 different in crown height C were subjected to one trial.

The results of the experiments are illustrated in FIGS. 4 and 8–10. In the diagrams, the horizontal axis represents the temperature, and the vertical axis represents the crown height C. The solid circles indicate measurements when the temperature is rising, and the open circles represent measurements when the temperature is falling.

Figure 8:
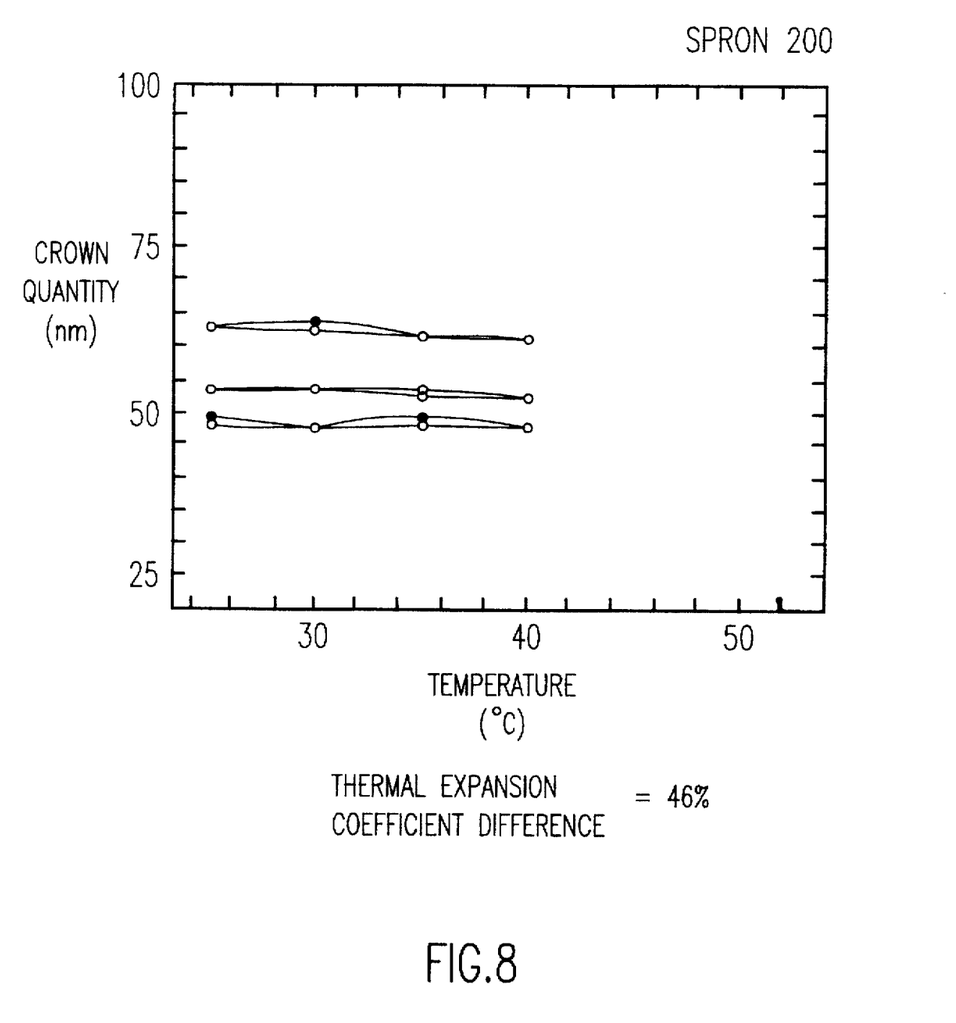
FIG. 8 is a diagram illustrating the results of an experiment #1 when the thermal expansion coefficient difference is set at 46%.

The results of the experiments on the above-mentioned magnetic head assembly, which is the preferred embodiment of the present invention, are illustrated in FIG. 8.

This experiment will be hereinafter referred to as experiment #1. In experiment #1, the thermal expansion coefficient difference between the slider 10 and the gimbal spring was 46%. It is seen that the crown height C hardly varied during any of the three trials. The average variation of the crown height C determined by the three trials is 2 nm.

Figure 9:
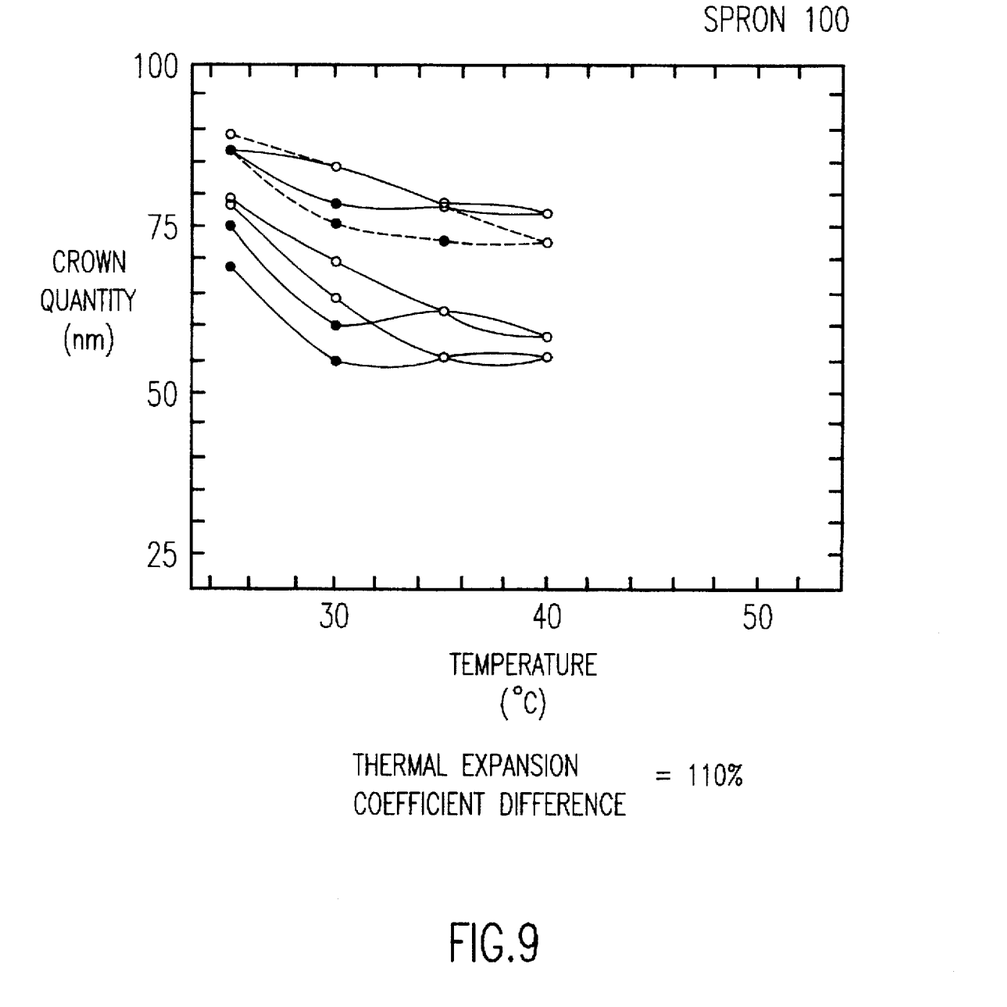
FIG. 9 is a diagram illustrating the results of an experiment #2 when the thermal expansion coefficient difference is set at 110%.

FIG. 9 shows the result of the experiment in which the thermal expansion coefficient difference between the slider 10 and the gimbal spring 20 was 110%. In other words, the thermal expansion coefficient of the gimbal spring 20 was $12.0 \times 10^{-6}$. This experiment is hereinafter referred to as experiment #2. The material of the gimbal spring 20 was Spron #100 manufactured by Seiko Electronic Parts Co., Ltd. FIG. 9 shows that the crown height C significantly varied during all four trials. The average variation of the crown height C determined by the four trials is 24 nm.

Figure 10:
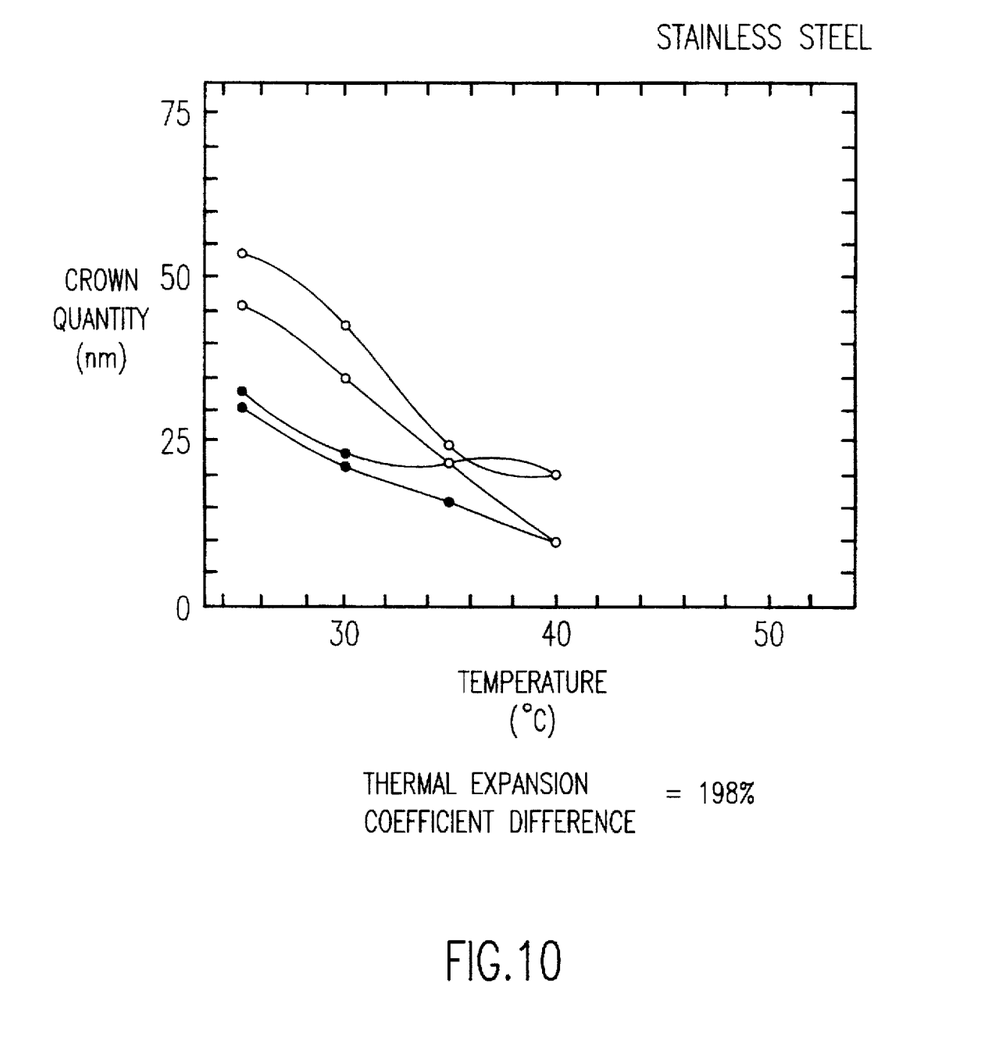
FIG. 10 is a diagram illustrating the results of an experiment #3 when the thermal expansion coefficient difference is set at 46%.

FIG. 10 shows the result of the experiment during which the thermal expansion coefficient difference between the slider 10 and the gimbal spring 20 is 198%. That is, the thermal expansion coefficient of the gimbal spring 20 was $17.0 \times 10^{-6}$. This experiment is hereinafter referred to as experiment #3. The material of the gimbal spring 20 was stainless steel. FIG. 6 shows that the crown height C significantly varied during both of the two trials. The average variation of the crown height C determined by the two trials is 46 nm.

Next will be explained the results of the analysis of these comparative experimental findings with reference to the drawings.

Figure 11:
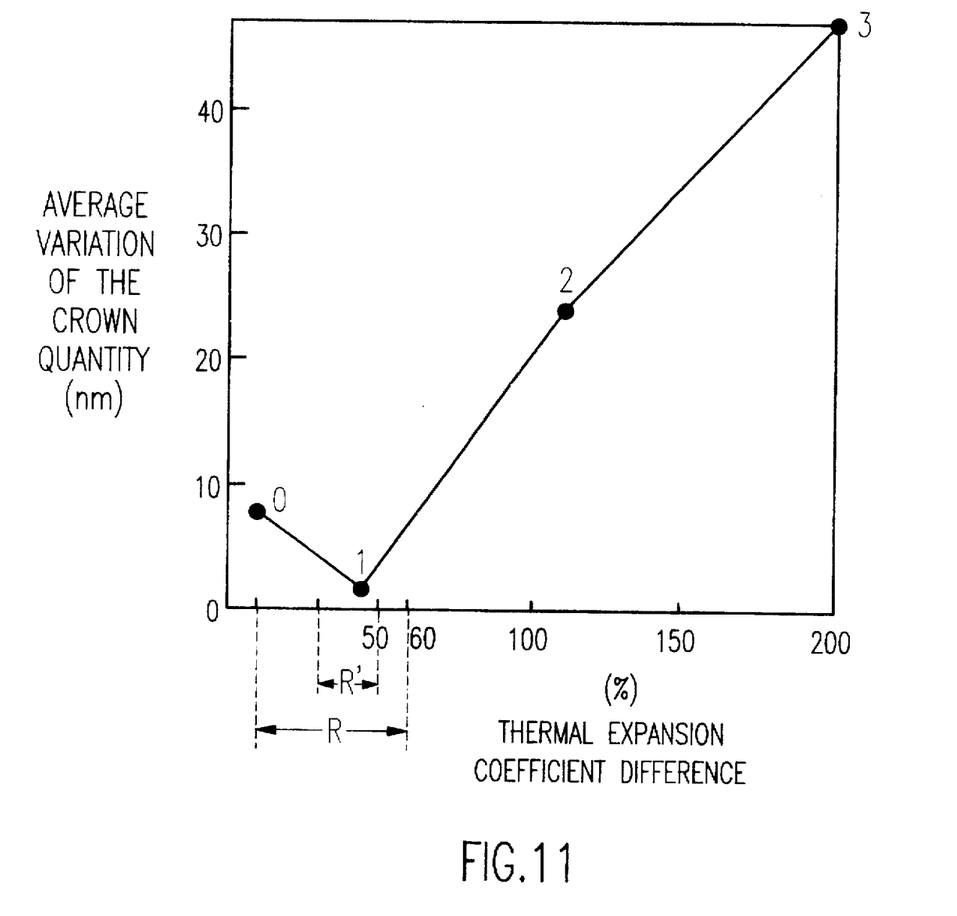
FIG. 11 is a diagram illustrating the relationship between the thermal expansion coefficient difference and the average variation of the crown height.

FIG. 11 shows the average variations of the crown height C obtained by experiments #0 through #3. In FIG. 11, the horizontal axis represents the difference in thermal expansion coefficient and the vertical axis represents the average crown height C. The solid circles represent measurements, and numerals assigned to the solid circles represents the reference numbers of the experiments.

Referring to FIG. 11, when the results of Experiments #0 through #3 are linked by straight lines, it is seen that the crown height C varies less at least in a range R where the difference in thermal expansion coefficient is from 10% to 60% than at a 5% difference in thermal expansion coefficient. Thus, by setting the thermal expansion coefficient difference between the slider 10 and the gimbal spring 20 within the range R, crown deformation can be more effectively reduced than by the prior art technique in which the thermal expansion coefficient difference is brought as close to 0 (e.g., a negligible difference) as possible. This is an unexpected finding, against the earlier common knowledge of those skilled in the art.

In order to further ensure the prevention of crown deformation, the range of the thermal expansion coefficient difference can be narrowed to a range R' between 30% and 50%. To make the effect even more significant, the thermal expansion coefficient difference can be set at approximately 46%.

Next is considered the reason why this preferred embodiment of the invention can reduce the crown deformation. No sure reason has been identified yet. However, the deformation of the slider 10 alone is conceivable as a very likely reason.

Crown is formed on the slider 10 by the fabrication process described above. At this time, stress arises within the curved slider 10. This stress remains after the slider 10 is disengaged from the fixture 40 and the effect of the stress becomes more significant with rising temperature to deform the slider 10. Thus, even if the thermal expansion coefficient difference is set at 0 (e.g., a negligible difference), the slider 10 is deformed by itself.

By setting the thermal expansion coefficient of the gimbal spring 20 higher than that of the slider 10 by 10% to 60%, the slider 10 deforms because of the thermal expansion coefficient difference. This deformation due to the thermal expansion coefficient difference presumably cancels out the deformation of the slider 10 by stress in itself.

Next will be described modifications of the first embodiment.

The slider 10 and the gimbal spring 20 are made of various materials to the extent that the thermal expansion coefficient difference between them falls in the range between 10% to 60%. Such combinations of materials include the combination of calcium titanate-based ceramic used as the slider 10 and SUS 304 stainless steel used as the gimbal spring 20.

The configuration according to the present invention can be effectively applied to floppy disk apparatuses as well as hard disk apparatuses.

As hitherto described, according to the present invention, a magnetic disk assembly is configured so that the thermal expansion coefficient of the gimbal spring 20 is 10% to 60% higher than that of the slider 10. This configuration reduces the deformation of the magnetic heads more effectively than the prior art technique. As a result, a magnetic disk apparatus to which a magnetic disk assembly according to the present invention is applied, can read and write data more accurately than other magnetic disk apparatuses which incorporate the prior art technique.

The present embodiments are therefore, to be considered in all respects as illustrative and not restrictive, the scope of the invention being indicated by the appended claims rather than by the foregoing description and all changes which come within the meanings and range of equivalency of the claims are therefore intended to the embraced therein.

What is claimed is:

1. A magnetic head assembly comprising a slider having a crown and a spring coupled to said slider, a thermal expansion coefficient of said spring being greater than a thermal expansion coefficient of said slider by 10% to 60%, said slider being prepared by a method comprising steps of:
   - a first step of attaching a first face of said slider to a concave surface;
   - a second step of forming a second face of said slider opposing to said first face into a flat surface; and
   - a third step of disengaging said slider from said concave surface.

2. A method of preventing deformation in a magnetic head assembly comprising a slider and a spring attached to said slider, said method comprising steps of:
   providing said slider with a first thermal expansion coefficient, said slider being formed by attaching a first face of said slider to a concave surface and forming a second face of said slider opposing said first face into a flat surface;
   providing said spring with a second thermal expansion coefficient, said second thermal expansion coefficient being greater than said first thermal expansion coefficient by 10% to 60%; and
   disengaging said slider from said concave surface.

* * * * *